United States Patent [19]

Ozaki

[11] Patent Number: 5,502,749
[45] Date of Patent: Mar. 26, 1996

[54] RADIO RECEIVER APPARATUS AND PHASE CORRECTING METHOD THEREOF

[75] Inventor: Shinji Ozaki, Saitama, Japan

[73] Assignee: Sony Corporation, Tokyo, Japan

[21] Appl. No.: 214,447

[22] Filed: Mar. 18, 1994

[30] Foreign Application Priority Data

Mar. 30, 1993 [JP] Japan .................... 5-096826

[51] Int. Cl.⁶ .................. H04L 7/00; H04J 3/06
[52] U.S. Cl. ...................... 375/368; 370/105.4
[58] Field of Search ................. 370/105.4; 375/116, 375/368

[56] References Cited

U.S. PATENT DOCUMENTS

| | | | |
|---|---|---|---|
| 3,786,415 | 1/1974 | Phillips et al. | 375/116 |
| 4,748,623 | 5/1988 | Fujimoto | 375/116 |
| 5,305,347 | 4/1994 | Roschmann et al. | 375/210 |
| 5,347,548 | 9/1994 | Messerges et al. | 375/116 |
| 5,420,895 | 5/1995 | Kim | 375/368 |

FOREIGN PATENT DOCUMENTS

| | | | |
|---|---|---|---|
| 0152108 | 8/1985 | European Pat. Off. | 370/105.4 |
| 0371357 | 6/1990 | European Pat. Off. | H04B 7/26 |
| 8706086 | 10/1987 | WIPO | 375/116 |
| WO9204783 | 3/1992 | WIPO | H04B 7/015 |

*Primary Examiner*—Stephen Chin
*Assistant Examiner*—Jeffrey W. Gluck
*Attorney, Agent, or Firm*—Jay H. Maioli

[57] ABSTRACT

A radio receiver apparatus receives a transmission signal having a reference pattern formed of a predetermined bit pattern. The apparatus has a receiving unit, a received data processing unit and first and second phase shift information detection units. The receiving unit demodulates the transmission signal to generate received data. The received data processing unit processes the received data in synchronism with the reference pattern. The first phase shift information detection unit detects first phase shift information of the received data corresponding to the data processing of the received data processing unit. The second phase shift information detection unit shifts the phase of the received data so as to detect second phase shift information of the received data corresponding to the data processing of the data processing unit. The apparatus corrects the phase shift of the received data by comparing output signals from the first and second phase shift detection units.

16 Claims, 11 Drawing Sheets

$$Cx = Cz$$

$$Cy \geqq Cz$$
$$Cz > Cx$$

$Cy \geqq Cx$
$Cx > Cz$ $Cx \geqq Cz, Cy$
$Cz \geqq Cy$

FIG. 12A
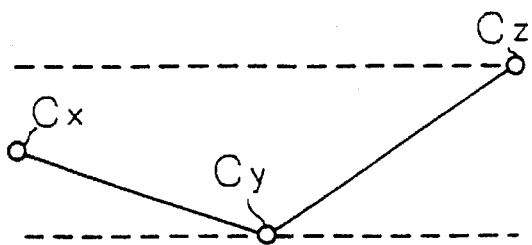
FIG. 12B
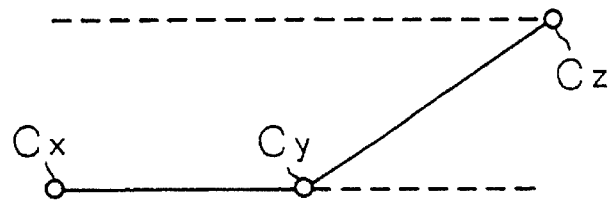
$$C_x \leqq C_y \cdot C_z$$
$$C_z > C_y$$
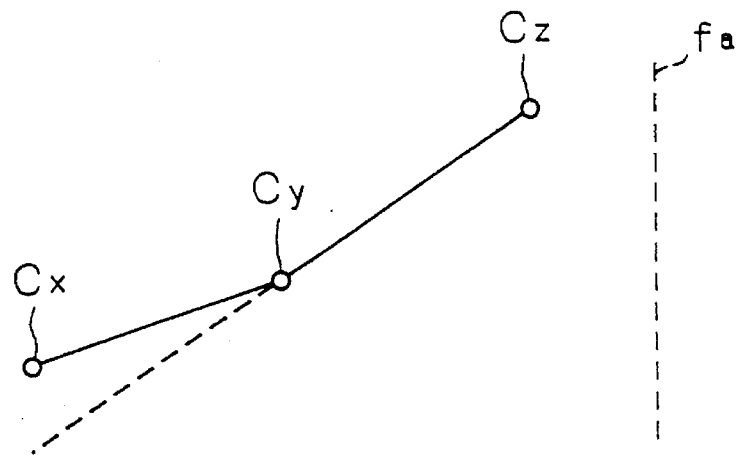
$$C_x \leqq C_y \cdot C_z$$
$$C_z - C_y > C_y - C_x$$
FIG. 13

$$C_z \geqq C_y$$
$$C_z - C_y \leqq C_y - C_x$$

RADIO RECEIVER APPARATUS AND PHASE CORRECTING METHOD THEREOF

BACKGROUND OF THE INVENTION

1. Field of the Invention

This invention relates to a radio receiver apparatus and more particularly to a method for phase correction thereof.

2. Description of the Related Art

Conventionally, in a digital cellular system, which is one type of radio telephone, a voice signal is transmitted and received in a coded manner so that a channel can be used simultaneously by a plurality of terminal devices by applying the technique of time-division multiplexing. When power is applied, a terminal device of this type sequentially scans 124 channels previously set to detect a channel at which the electric field strength is most intense. The terminal device then detects a BCCH (broadcast control channel) assigned to an area to which the terminal device belongs and receives such BCCH.

The BCCH has time slots through which various information is transmitted. In the digital cellular system each terminal device receives information from the base station which transmits the BCCH, information on neighboring base stations and access information of terminal devices.

Thus, the terminal device detects an FCCH (frequency correction channel) which is included within the BCCH at a predetermined timing, to thereby generally detect a timing at which the necessary information is transmitted on the basis of the FCCH.

The FCCH is a synchronizing signal to which a bit pattern is assigned so that data of the value "1" continues for a predetermined number of bits when demodulated. The terminal device detects the timing of the FCCH to synchronize, i.e., frame synchronize, its overall operation with the timing of received data S.

Upon attaining frame synchronization by the FCCH in this manner, the terminal device synchronizes its overall operation with bursts.

A burst is output onto the BCCH at a predetermined timing and, as FIG. 1 shows, a training sequence is put in at substantially the center thereof. The training sequence is formed by repeating data of value "1" and value "0" in a previously set bit pattern, whereas the FCCH is formed by assigning a bit pattern so that data of value "1" continues for a predetermined number of bits.

This type of digital cellular system generally synchronizes its overall operation with the received data on the basis of the FCCH, and synchronizes the overall operation according to the bits received from the training sequence.

In particular, by detecting a correlation between a predetermined bit pattern and received data, the terminal device detects a timing at which the correlation value rises so as to detect the timing of a training sequence. Thereby, the terminal device detects the timing of the received data by bit, and synchronizes its overall operation with a burst by controlling and overall operation on the basis of the detected result of the correlation value.

The terminal device monitors the BCCH so that, upon detection of the access information from the base station, it is capable of communicating with a desired destination by shifting to a designated channel. Then, on the basis of a comparison with the reception of the BCCH of a neighboring base station, the terminal device switches to the BCCH offering the best reception, so that, even in case of moving into a neighboring area, the communication can be secured.

As FIG. 2 shows, data received at this type of terminal device is characterized by continuous fluctuation in its frequency due to fading.

Such fluctuation in frequency tends to be large in comparison with a burst and a frequency changed only by a certain value is maintained within one burst.

For this reason, in the case where data is processed at the terminal device by detecting the timing of a training sequence, even though data can be processed at a timing synchronized in phase with the received data within the training sequence, a phase shift between the timing of data processing and the timing of the received data may occur at both ends of a burst which are distant from the training sequence.

In this case, the bit error rate increases at both ends of the burst, thereby making it difficult to receive correct data.

Further, since this type of terminal device is formed as a superheterodyne system, a similar state occurs also in the case where a frequency offset of the local oscillating signal occurs.

In this case, for example, a method can be considered of correcting this type of phase shift by generating a clock as a reference for received data processing in a PLL circuit formed as an analog circuit. In this case, however, there is a problem that the overall construction becomes intricate and complicated, and the reliability thereof is also reduced since noise is increased and it is impossible to completely prevent deterioration due to aging of the elements forming the circuit.

On the other hand, another method can be also considered of estimating the amount of change in the frequency by sequentially detecting the amount of the phase shift so as to switch the timing of data processing by the estimated result. In this case, however, there is a disadvantage that operational processing becomes intricate and there can be a case of erroneously estimating the frequency, thereby causing a serious communication failure.

Furthermore, in this case where the amount of the phase shift is actually detected, there is also a disadvantage that the phase shift, with respect to the burst itself, which is utilized in the detection cannot be corrected by the detection results.

SUMMARY OF THE INVENTION

It is, therefore, an object of the present invention to provide a radio receiver apparatus which resolves the above-mentioned problem.

It is another object of the present invention to provide a method for phase shift correction of the radio receiver apparatus which resolves the above-mentioned problem.

According to the present invention, there is provided a radio receiver apparatus for receiving a transmission signal on the basis of a reference pattern put in the transmission signal at a predetermined timing, including a receiving unit, a received data processing unit, and first and second phase shift information detection units. The receiving unit demodulates the transmission signal to output the received data. The received data processing unit performs data processing on the received data in synchronization with the receive data on the basis of a reference pattern which is composed of a predetermined bit pattern. The first phase shift information detection unit detects first phase shift information of the received data with respect to data processed by the received data processing unit on the basis of the reference patten. The second phase shift information detection unit shifts the phase of the received data to detect second phase shift information of the received data with respect to the processed data received from the received data processing unit on the basis of the reference pattern. The radio receiving unit corrects the phase shift of the received data, based on a comparison of the output signals from the first phase shift detection unit and the second phase shift detection unit.

According to the present invention, there is provided a radio receiver apparatus for receiving a transmission signal on the basis of a reference pattern put in the transmission signal at a predetermined timing including a receiving unit, a phase correction unit and a control unit. The receiving unit demodulates the transmission signal and outputs the received data. The phase correction unit calculates a correlation value of received data based on the reference pattern and the received data supplied sequentially, and then performs a phase correction for the received data. The control unit detects a phase shift based on the correlation value supplied from the phase correction unit and controls the phase correction unit based on the detected phase shift.

According to the present invention, there is provided a method for phase correction of the radio receiver apparatus for receiving a transmission signal on the basis of a reference pattern put in the transmission signal at a predetermined timing. A first correlation value is calculated between the reference pattern and the received data, and second and third correlation values are calculated when the frequencies of the received data are changed so as to become a lagging phase and a leading phase. It is then determined whether the first correlation value is the largest among first, second and third correlation values which are obtained by calculation. Then, the phase of the received data is corrected and controlled, based on the determination.

According to the present invention, there is provided another method for phase correction of the radio receiver apparatus for receiving a transmission signal on the basis of a reference pattern put in the transmission signal at a predetermined timing, in which a first correlation value is calculated between the reference pattern and the received data, and second and third correlation values are calculated when frequencies of the received data are changed so as to become a lagging phase and a leading phase. The largest correlation value is detected by comparing the first, second and third correlation values which are obtained by detection to accumulate the largest correlation value during the predetermined period. The correlation value which has the largest value is detected based on the result of the accumulation, and the phase shift is detected on the basis of the largest correlation value obtained, so that the phase shift of the frequency of the received data is corrected based on the detected phase shift.

In accordance with this invention, phase shift information is detected on the basis of a reference pattern put in a transmission signal. Phase shift information is also detected by shifting the phase of the received data to correct the phase shift of the received data based on a comparison of the phase shift information. It is thus possible to provide a radio receiver apparatus and a method for the phase correction of the radio receiver apparatus in which the phase shift of the received data can be corrected in a simple and reliable manner.

The nature, principle and utility of the invention will become more apparent from the following detailed description of the preferred embodiments thereof when read in conjunction with the accompanying drawings, in which like parts are designated by like reference numerals or characters.

BRIEF DESCRIPTION OF THE DRAWINGS

In the accompanying drawings:

FIGS. 12A and 12B are schematic diagrams explaining the case where the third correlation value detection result is the largest;

FIG. 13 is a schematic diagram explaining the case where the third, the first, and the second correlation value detection results become sequentially smaller in that order;

DESCRIPTION OF THE PREFERRED EMBODIMENTS

Figure 3:
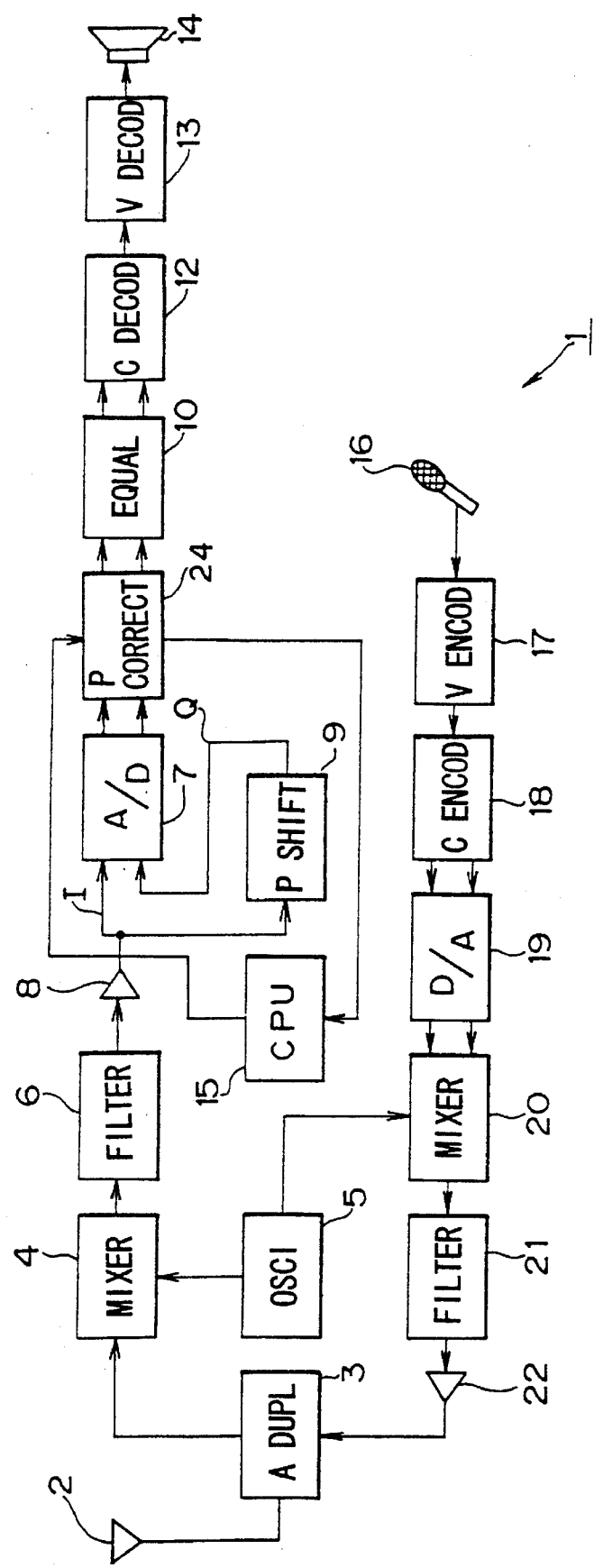
FIG. 3 is a block diagram showing a terminal device of a digital cellular system as a radio receiver apparatus according to an embodiment of this invention.

Preferred embodiments of the radio receiver apparatus in accordance with this invention will be described with reference to the accompanying drawings:

In FIG. 3, 1 denotes generally a block diagram of a terminal device of a digital cellular system. The terminal device 1 receives a signal transmitted from a base station at an antenna 2. The received signal is supplied to a mixer 4 through an antenna duplexer 3.

The mixer 4 effects a frequency conversion of the received data by means of a local oscillating signal generated by an oscillating section 5 and then supplies it through a filter 6. The terminal device 1 can thus selectively receive a desired channel by switching the frequency of the local oscillating signal.

The output signal from the filter 6 is supplied to an analog-to-digital conversion circuit (A/D) 7 through an amplifying circuit 8. An analog-to-digital conversion circuit 7 converts its input to a digital value on the basis of a predetermined reference signal and generates a digital output. Thereby, the terminal device 1 demodulates I-data to obtain a demodulation result at a timing synchronized with a reference phase of the received signal.

The output signal from the amplifying circuit 8 is also supplied to the analog-to-digital conversion circuit 7 though a phase shifter 9, and the analog-to-digital conversion circuit 7 converts that input signal to a digital value. The terminal device 1 thus demodulates Q-data consisting of a demodulation result which differs in phase by 90° from the I-signal: i.e., the terminal device 1 demodulates the I-data and the Q-data transmitted as a GMSK-modulated signal.

An equalizer 10 corrects multipath distortion of the I-data and Q-data. A channel decoder 12 selects voice data from the output of the equalizer 10 and generates an output supplied to a voice decoder 13.

The voice decoder 13 demodulates the voice signal transmitted as converted into I-data and Q-data and then drives a speaker 14.

With the above constitution, the terminal device 1 can receive and output a voice signal transmitted from a remote location through a base station.

The equalizer 10 detects an FCCH on the basis of the I-data and Q-data from the analog-to-digital conversion circuit 7 and supplies the detection result to a central processing unit (CPU) 15. The central processing unit 15 controls operation of equalizer 10, channel decoder 12, etc., on the basis of such detection result.

The terminal device 1 receives predetermined information transmitted from a base station on the basis of the FCCH detection result. The terminal device 1, by switching the frequency of the local oscillating signal based on the reception result, switches the frequency to a predetermined communication channel and then receives a voice signal transmitted in a predetermined time slot.

On the other hand, the transmitting system of the terminal device 1 converts a voice signal output from a microphone 16 into voice data at a voice encoder 17 and then converts the converted voice signal into I-data and Q-data at a channel encoder 18.

A digital-to-analog conversion circuit (D/A) 19 converts the I-data and Q-data into analog signals having an I-component and a Q-component. A mixer 20 converts the analog signals with the I-component and Q-component into a transmission signal of a predetermined frequency by means of a local oscillating signal.

The terminal device 1 supplies the output of the mixer 20 to a power amplifier 22 through a filter 21 and transmits the output of the power amplifier 22 from the antenna 2 through the antenna duplexer 3.

The terminal device 1 switches the transmitting the receiving timing on the basis of a predetermined timing detected at the equalizer 10. Thereby the terminal device 1 selectively receives during a time slot assigned to its station among transmission signals transmitted to plural terminal devices from the base station by applying the technique of time division multiplexing and transmits voice data to the base station during a time slot assigned to its station.

The phase shift correction of the terminal device constructed in the manner described above is effected as follows.

The terminal device 1 achieves frame synchronization on the basis of the FCCH, synchronizes its overall operation with the received data on the basis of a burst, and then receives desired data during a specified time slot.

In particular, when power to the terminal device is turned on or when the area to which the terminal device belongs is changed, the central processing unit 15 supplies a control command to the oscillating section 5 to receive a BCCH and then supplies control data to the equalizer 10 to detect the FCCH.

Upon detection of the timing of the FCCH, the central processing unit 15 sets a time base counter which is incorporated into the equalize 10 on the basis of such timing so as to achieve frame synchronization of the overall operation.

Figure 4:
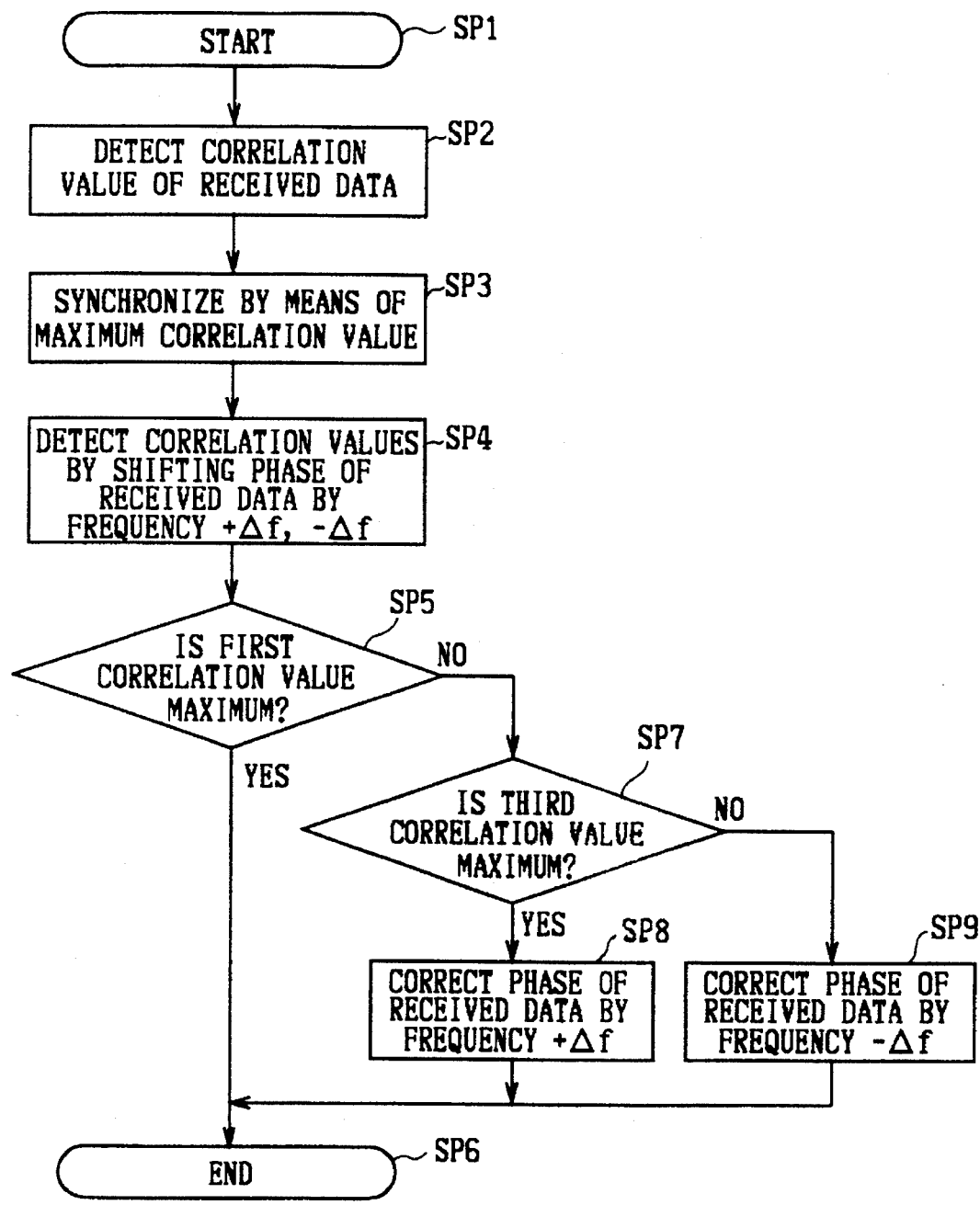
FIG. 4 is a flowchart explaining the phase correction.

When frame synchronization is achieved in this manner on the basis of the FCCH, the terminal device 1 synchronizes with bursts and corrects the phase shift by subsequently executing a processing procedure as shown in FIG. 4 with a predetermined periodicity.

In particular, upon setting of the time base counter, the central processing unit 15 subsequently proceeds from step SP1 to step SP2. Here, the central processing unit 15 supplies control data to a phase correction circuit 24 to detect a training sequence which is contained in a burst signal.

Figure 1:
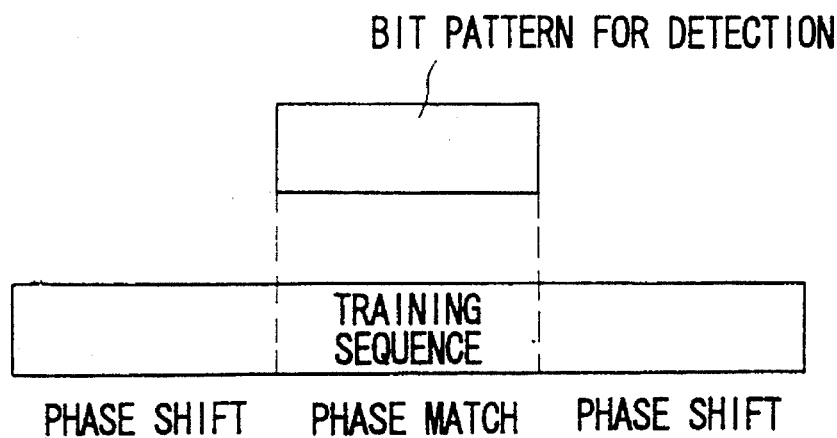
FIG. 1 is a schematic diagram explaining a training sequence.
Figure 2:
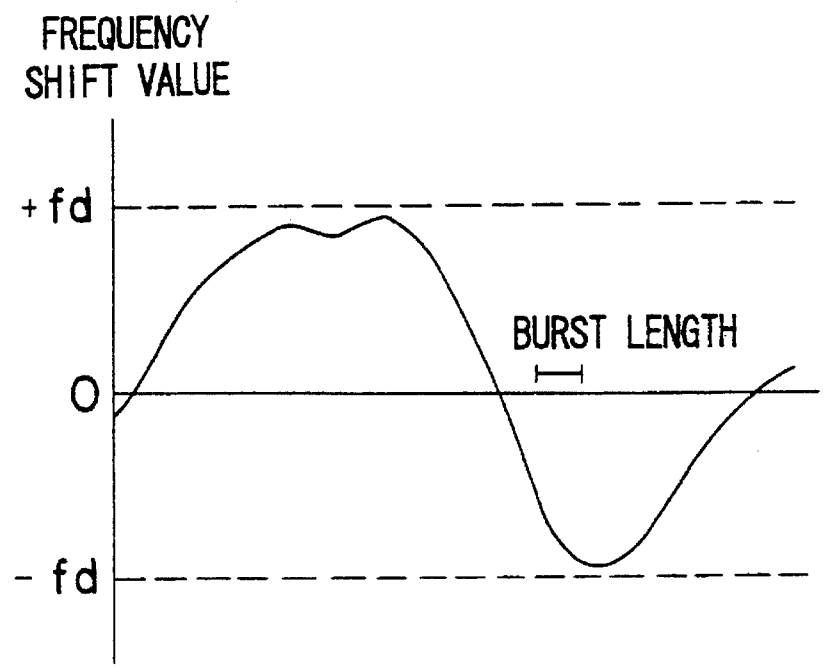
FIG. 2 is a characteristic curve explaining fluctuation in frequency due to fading.

As described above with respect to FIG. 1, the phase correction circuit 24 sequentially executes an operational processing of the equation $$Cy = \sum_{i=1}^{N} (Xi \cdot Pi) \qquad (1)$$

between a bit pattern from detecting a training sequence and received data sequentially supplied thereto so as to detect a correlation value Cy. In equation (1), Xi indicates received data; Pi indicates data of the bit pattern for detecting a training sequence; and N indicates the bit number of the bit pattern for detecting the training sequence.

The phase correction circuit 24 detects a maximum value from the correlation value sequentially obtained at a subsequent step SP3. The central processing unit 15 detects the timing of the training sequence based on this value and sets a reference counter on the basis thereof so as to synchronize the overall operation of the terminal device 1 with the burst.

The terminal device 1 processes the received data Xi which is sequentially obtained at a timing synchronized with this burst. At this time, the phase correction circuit 24 supplies the maximum value of the correlation value detection results to the central processing unit 15. The central processing unit 15 stores the maximum correlation value in a predetermined register as a first correlation value detection result Cy.

The central processing unit 15 subsequently proceeds to step SP4 and supplies control data to the phase correction circuit 24 to change the frequency of the received data Xi so as to detect the second and third correlation values Cx and Cy.

The phase correction circuit 24, in response to the control command from the central processing unit 15, executes an operation processing of the equations $$Cx = \sum_{i=1}^{N} (Xi \cdot Pi \cdot \exp(j \times 2\pi \times (-\Delta f) \times \Delta t \times i)) \quad (2)$$

$$Cz = \sum_{i=1}^{N} (Xi \cdot Pi \cdot \exp(j \times 2\pi \times \Delta f \times \Delta t \times i)) \quad (3)$$

to detect correlation values Cx and Cz obtained when the received data Xi has a lagging phase and a leading phase, respectively, by a frequency $\Delta f$. Here, $\Delta f$ indicates the frequency to be shifted; $\Delta t$ indicates the sample length of the received data; and "j" indicates the imaginary unit.

The phase correction circuit 24 calculates the second and third correlation values Cx and Cz obtained when changing the frequency of the received data by applying the technique of operational processing, so as to detect phase shift information of the received data at respective frequencies based on the result of the operational processing. The correlation value detection results are supplied to the central processing unit 15.

The central processing unit 15 at a subsequent step SP5 obtains comparison results among the first to third correlation values Cx to Cz, to thereby determine whether or not the first correlation value Cy obtained without shifting the frequency is the maximum value among the first to third correlation values Cx to Cz.

If an affirmative result is obtained at step SP5, the central processing unit 15 proceeds to step SP6 to terminate this processing procedure and, after the lapse of a predetermined time period, repeats this processing procedure.

More specifically, if the first correlation value Cy obtained without shifting the frequency is the largest among the first to third correlation values Cx to Cz, it is determined that a frequency shift of the received data Xi scarcely occurs. Accordingly, in this case, the terminal device 1 is able to correctly process the received data Xi by processing the sequentially obtained received data Xi at a timing synchronized with the burst.

On the other hand, when the frequency of the received data Xi is shifted, the second or third correlation value Cx or Cz rises to the maximum value, depending on the direction of the shift.

By correcting the processing timing of the received data Xi in accordance with the shift of the frequency, the phase shift can be correspondingly corrected and the deterioration in bit error rate can be reduced.

Further, instead of this correction to timing, the phase shift can be readily corrected by correcting the frequency of the received data Xi, using the technique of operational processing in a manner similar to the cases of equations (2) and (3) in which the frequency of the received data Xi is shifted and multiplied by the bit pattern in a training sequence to detect correlation values.

By correcting the phase shift by applying the technique of operational processing in this manner, the phase shift can be corrected also with respect to the received data Xi provided for the second and third correlation value detection processing Cx and Cz. Therefore, a data processing result which is similar to the case where data is processed at a correct timing can be obtained using a simple construction.

The central processing unit 15 terminates the processing procedure without correcting the phase shift of the received data Xi if an affirmative result is obtained at step SP5. On the other hand, if a negative result is obtained at step SP5, the central processing unit 15 proceeds to step SP7 and determines at step SP7 whether or not the third correlation value detection result Cz is the largest among the first to the third correlation values Cx to Cz.

If an affirmative result is obtained at step SP7, the central processing unit 15 proceeds to step SP8.

At step SP8, the central processing unit 15 delivers a control command to the phase correction circuit 24 to correct the phase shift of the received data Xi so as to lead the phase and then proceeds to step SP6.

In response to this control command, the phase correction circuit 24 executes operational processing in which the frequency of the received data Xi is shifted in accordance with equation (3) to thereby correct the phase shift of the received data Xi.

On the other hand, if a negative result is obtained at step SP7, the central processing unit 15 proceeds to step SP9. The central processing unit 15 delivers a control command to the phase correction circuit 24 at step SP9 to correct the phase shift of the received data Xi so as to lag the phase, and then proceeds to step SP6.

More specifically, in response to this control command, the phase correction circuit 24 executes operational processing in which the frequency of the received data Xi is shifted in accordance with equation (2), to thereby correct the phase shift of the received data Xi.

Therefore, the terminal device 1 can detect the phase shift by a simple operational processing in which the second and third correlation values Cx and Cz are detected in addition to the first correlation value Cy which is necessary for burst synchronization, and their relative sizes are merely compared. The terminal device 1 can readily correct the phase shift by applying the technique of the operational processing based on this detection result, whereby the received data can be processed reliably.

The following is a description of the operation of phase shift correction of the radio receiver apparatus in accordance with the second embodiment of this invention.

In this second embodiment, not only the direction of the phase shift but also the amount of the phase shift is detected on the basis of the second and the third correlation values which are detected by means of displacing the frequency of the received data. The phase shift of the received data is corrected based on the direction of the phase shift and the amount of the phase shift.

In the second embodiment, upon detection of the first to third correlation values Cx to Cz in a manner similar to the first embodiment, the central processing unit 15 subsequently executes a processing procedure shown in FIG. 5 to thereby correct the phase shift of the received data as required.

In particular, the central processing unit 15 proceeds from step SP10 to step SP11 and determines whether or not the second and third correlation value detection results Cx and Cz are equal to each other.

Figure 6A:
FIGS. 6A to 6C are schematic diagrams explaining the case where the second and the third correlation value detection results are equal to each other.
Figure 6B:
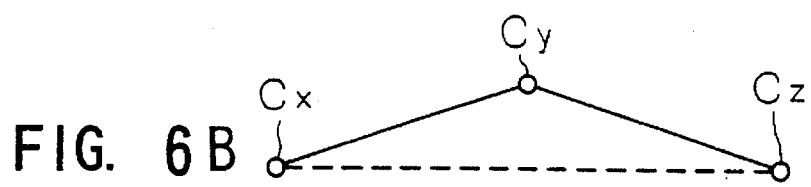
Figure 6C:
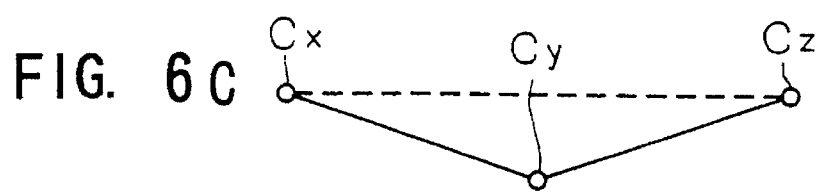

If an affirmative result is obtained at step SP11, as shown in FIGS. 6A to 6C, this case corresponds to one of three states: in the first state the first to third correlation value detection results Cx to Cz are equal to each other as shown in FIG. 6A; in the second state the first correlation value detection result Cy is larger than the second and third correlation value detection results Cx and Cz as shown in FIG. 6B; in the third state the first correlation value detection result Cy is smaller than the second and third correlation value detection results Cx and Cz as shown in FIG. 6C. The first and second states are the case where the phase shift of the received data is negligible.

The third state means that an error has occurred in the correlation value detection results. This shows that there is a possibility of erroneous correction if the phase of the received data is corrected.

Thus when an affirmative result is obtained at step SP11, the central processing unit 15 proceeds to step SP12 where the processing procedure is terminated without correcting the phase shift of the received data.

On the other hand, when a negative result is obtained at step SP11, the central processing unit 15 proceeds to step SP13 where it determines whether the equation $$Cy \geq Cz$$

$$Cz > Cx \qquad (4)$$

holds or not.

Figure 7A:
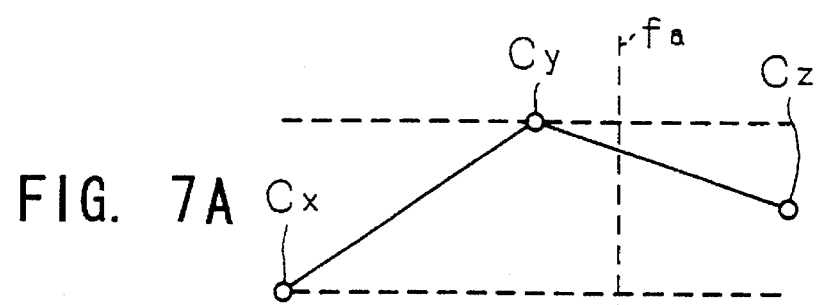
FIGS. 7A and 7B are schematic diagrams explaining the case where the second correlation value detection result is the smallest.
Figure 7B:
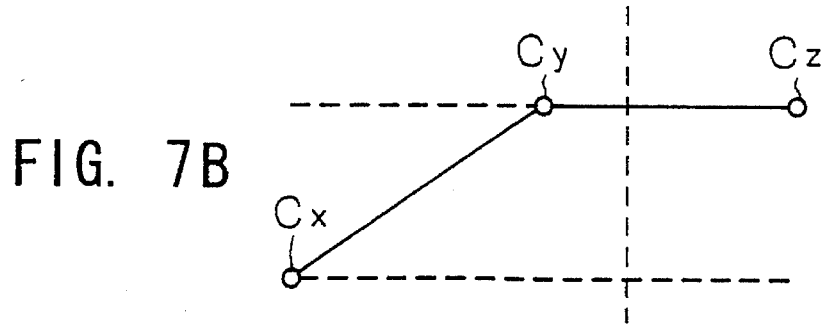

If an affirmative result is obtained, as shown in FIGS. 7A and 7B, this case corresponds to one of two cases: in the first case (FIG. 7B) the second correlation value detection result Cx is the smallest and the first and the third correlation value detection is results Cy and Cz are equal to each other; in the second case (FIG. 7A) the first correlation value detection result Cy is larger than the third correlation value detection result Cz. In the case shown in FIGS. 7A and 7B, a frequency "fa" by which the phase shift can be corrected to the minimum lies between the first and third correlation values Cy and Cz.

If an affirmative result is obtained at step SP13, the central processing unit 15 proceeds to step SP14 and executes operational processing of the equation $$ppm = \frac{hppm}{2}\left(1 - \frac{Cy - Cx}{Cy - Cz}\right) \qquad (5)$$

to detect a phase shift correction amount "ppm". Here, "hppm" indicates the limit value of the phase shift correction and, in the case of this embodiment, the frequency $\Delta f$ shifted in the second and third correlation value detection processing is to be assigned.

Therefore, the central processing unit 15 detects the phase shift direction and the phase shift correction amount and delivers a control command to the phase correction circuit 24 based on such detection result to correct the phase shift, and then proceeds to step SP12 to terminate the processing procedure.

On the other hand, if a negative result is obtained at step SP13, the central processing unit 15 proceeds to step P15 where it determines whether the equation $$Cy \geq Cx$$

$$Cx > Cz \qquad (6)$$

holds or not.

Figure 8A:
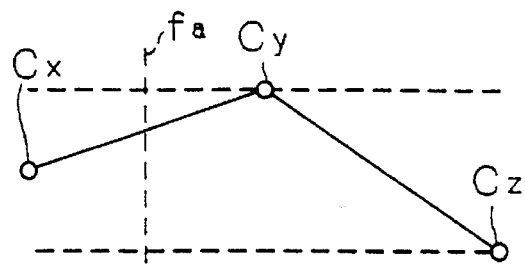
FIGS. 8A and 8B are schematic diagrams explaining the case where the third correlation value detection result is the smallest.
Figure 8B:
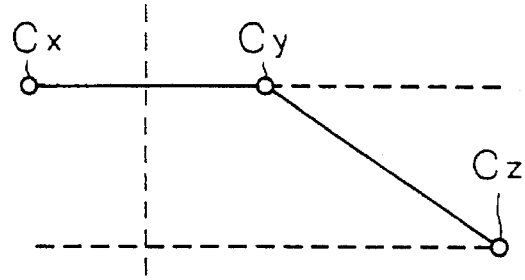

If an affirmative result is obtained, as shown in FIGS. 8A and 8B, this is opposite to the case of FIGS. 6A and 6B, and a frequency "fa" by which phase shift can be corrected to the minimum lies between the first and the second correlation values Cy and Cx. The central processing unit 15 proceeds to step SP16 and executes operational proceeding of the equation $$ppm = -\frac{hppm}{2}\left(1 - \frac{Cy - Cx}{Cy - Cz}\right) \qquad (7)$$

to detect the phase shift correction amount "ppm".

The central processing unit 15 detects the phase shift direction and phase shift correction amount "ppm" and, based on this, delivers a control command to the phase correction circuit 24 to correct the phase shift. It then proceeds to step SP12 to terminate the processing.

On the other hand, if a negative result is obtained at step SP15, the central processing unit 15 proceeds to step SP17 to determine whether or not the second correlation value Cx is the largest value among the three correlation values and, if an affirmative result is obtained, proceeds to step SP18 to determine whether or not the following equation holds:

$$Cz \geq Cy \qquad (8)$$

Figure 9A:
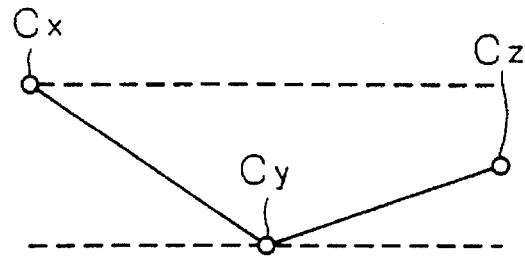
FIGS. 9A and 9B are schematic diagrams explaining the case where the second correlation value detection result is the largest.
Figure 9B:
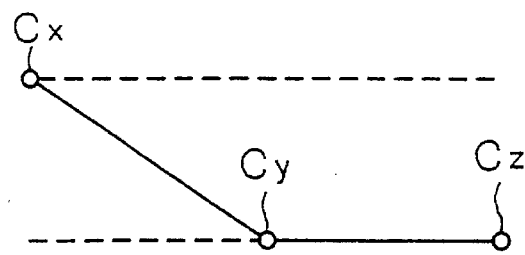

If an affirmative result is obtained at step SP18, as shown i FIGS. 9A and 9B, this corresponds to one of two cases wherein the second correlation value detection result Cx is the largest: in the first case (FIG. 9B), the first and the third correlation values Cy and Cz are equal to each other; in the second case, the values thereof become smaller in the order of the third correlation value Cz to the first correlation value Cy (FIG. 9A). These cases show that an error has occurred in the correlation value and that there is a possibility of erroneous correction if the phase of the received data is corrected.

Thus, if an affirmative result is obtained at step SP18, the central processing unit 15 proceeds to step SP12 to terminate this processing without correcting the phase of the received data.

On the other hand, when a negative result is obtained at step SP18, the central processing unit 15 proceeds to step SP19 to determine whether or not the following equation holds:

$$(Cx - Cy) > (Cy - Cz) \qquad (9)$$

Figure 10:
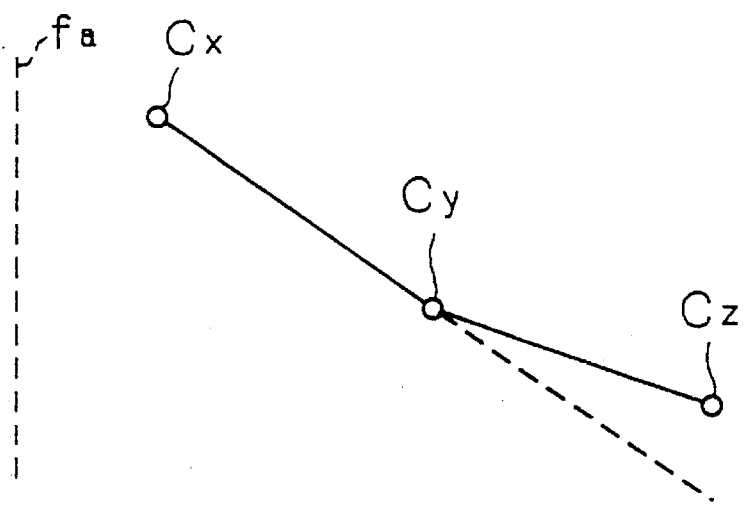
FIG. 10 is a schematic diagram explaining the case where the second, the first, and the third correlation value detection results become sequentially smaller in that order.

If an affirmative result is obtained at step SP19, as shown in FIG. 10, this corresponds to the case where the values become smaller in the order of the second correlation value Cx, the first correlation value Cy and the third correlation value Cz, and the increase in the correlation value becomes larger from the first correlation value Cy to the second correlation value Cx. In this case a frequency "fa" which is capable of correcting the phase shift to the minimum value lies outside of the second correlation value Cx.

If an affirmative result is obtained at step SP19, the central processing unit 15 proceeds to step SP20 to correct the phase shift of the received data toward the second correlation value Cy and proceeds to step SP12.

At this time, the central processing unit 15 corrects the phase shift of the received data so that the frequency is lowered correspondingly by the limit value "hppm" of the phase shift correction to execute a correction of a phase shift within a certain range.

More specifically, since it is possible that an error has occurred in the correlation value detection results Cx to Cy, the terminal device 1 avoids a large reduction in the bit error rate by correcting the phase shift within a certain range even when the correlation value detection results Cx to Cy are erroneously detected.

On the other hand, if a negative result is obtained at step SP19, the central processing unit 15 proceeds to step SP21.

Figure 11:
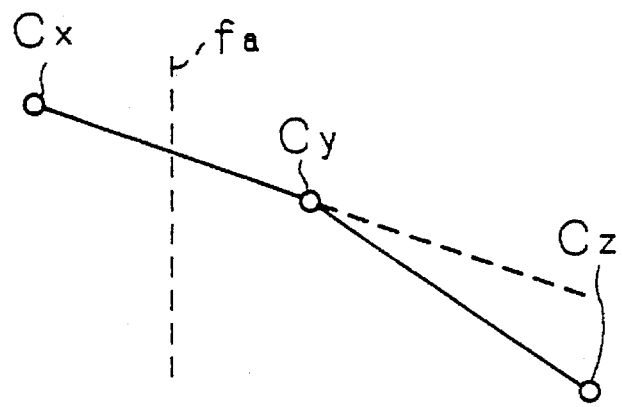
FIG. 11 is a schematic diagram explaining a case where the change from the first correlation value detection result to the third correlation value detection result is larger than the change from the second correlation value detection result to the first correlation value detection result.

FIG. 11 corresponds to the case where the value becomes smaller in the order of the second correlation value Cx, the first correlation value Cy and the third correlation value Cz, and the decease in the correlation value is larger from the first correlation value Cy to the third correlation value Cz. In this case a frequency "fa" which is capable of correcting the phase shift to the minimum value lies in the vicinity of the second correlation value Cx.

Thus, at the step SP21, the central processing unit 15 executes operational processing of the equation $$ppm = -\frac{hppm}{2}\left(1 + \frac{Cx - Cy}{Cy - Cz}\right) \qquad (10)$$

to detect phase the shift correction amount "ppm" and delivers a control command to the phase correction circuit 24 to correct the phase shift, and then proceeds to step SP12 to terminate the processing procedure.

On the other hand, if a negative result is obtained at step SP17, the central processing unit 15 proceeds to step SP22 and determines whether the following equation holds.

$$Cx \geq Cy \qquad (11)$$

If an affirmative result is obtained at step SP22, as shown in FIGS. 12A and 12B, this corresponds to the case where the second and the third correlation values Cx and Cz of FIGS. 9A and 9B are interchanged with each other. As a result, the central processing unit 15 directly proceeds to step SP12 in a manner similar to the case of step SP18 to terminate this processing procedure without correcting the phase shift of the received data.

On the other hand, if a negative result is obtained at step SP22, the central processing unit 15 proceeds to step SP23 to determine whether or not the following equation holds.

$$(Cz-Cy) > (Cy-Cx) \qquad (12)$$

If an affirmative result is obtained at step SP23, as shown in FIG. 13, this corresponds to the case where the second and third correlation values Cx and Cz of FIG. 10 are interchanged with each other. In this case, a frequency "fa" capable of correcting the phase shift to the minimum value lies outside of the third correlation value detection result Cy.

Thus, at step SP24, the central processing unit 15 corrects the phase shift of the received data in a manner opposite to the case of step SP20 so that the frequency is raised to the limit value "hppm" of the phase shift correction. Thereby the phase shift is corrected within a certain range and then the central processing unit 15 proceeds to step SP12.

On the other hand, if a negative result is obtained at step SP23, the central processing unit 15 proceeds to step SP25.

Figure 14:
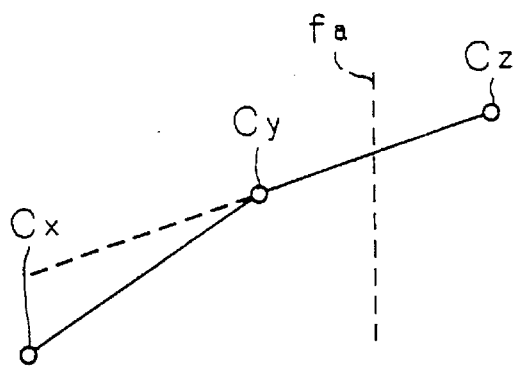
FIG. 14 is a schematic diagram explaining a case where the change from the first correlation value detection result to the third correlation value detection result is smaller than the change from the second correlation value detection result to the first correlation value detection result.

FIG. 14 corresponds to the case where the second and the third correlation values Cx and Cz of FIG. 11 are interchanged. In this case a frequency "fa" which is capable of correcting the phase shift to the minimum value lies in the vicinity of the third correlation value Cz.

Thus, the central processing unit 15 at step SP25 executes operational progressing shown in the equation $$ppm = \frac{hppm}{2}\left(1 + \frac{Cz - Cy}{Cy - Cz}\right) \qquad (13)$$

to detect a phase shift correction amount "ppm" and delivers a control command to the phase correction circuit 24 to correct the phase shift. The program proceeds to step SP12 to terminate the processing.

Figure 5:
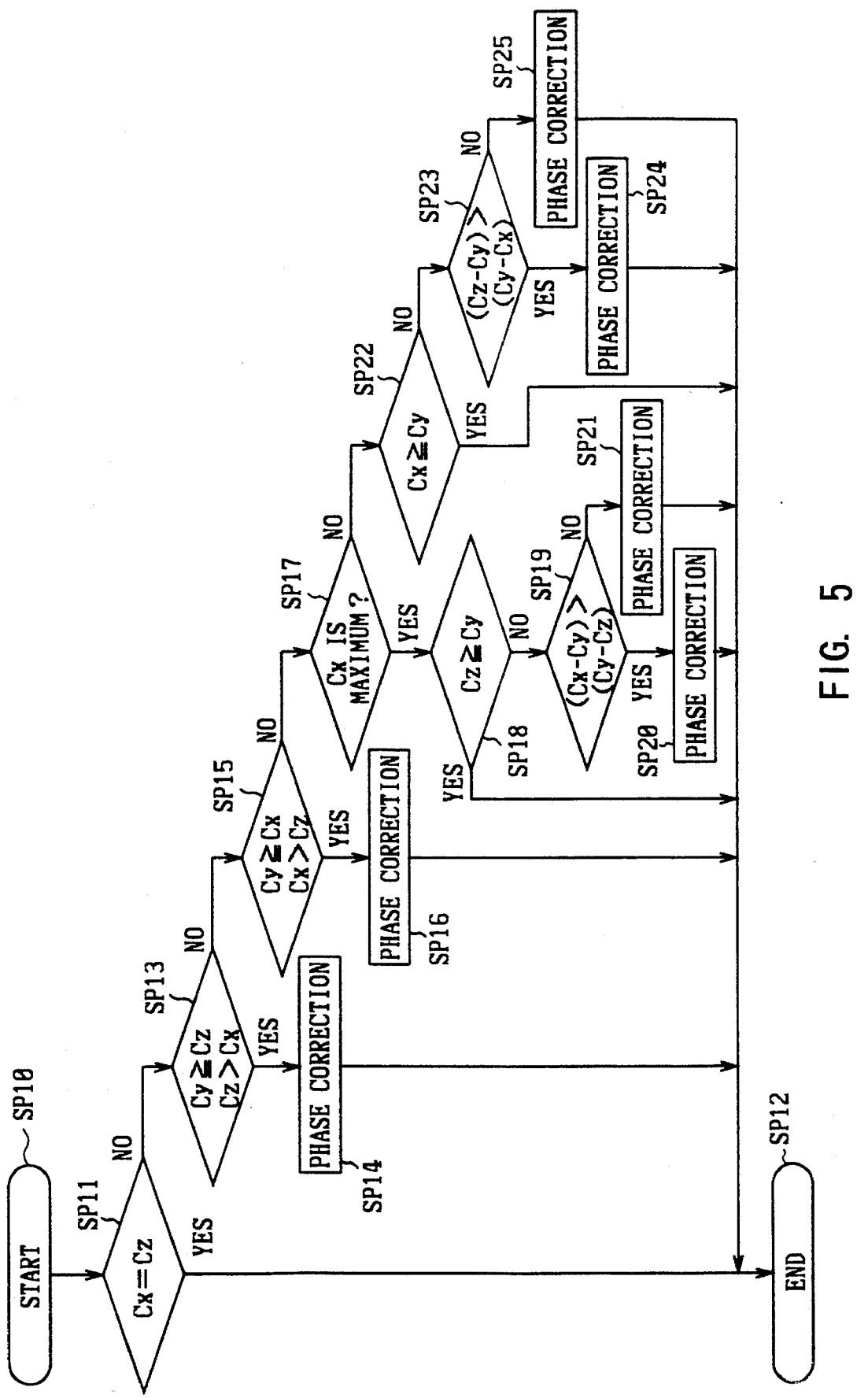
FIG. 5 is a flowchart explaining a second embodiment of a radio receiver apparatus according to this invention.

Thus, in accordance with the construction shown in FIG. 5, in the second embodiment, an advantage similar to that afforded by the first embodiment can be obtained. Furthermore in the second embodiment, by detecting the phase shift amount in addition to the phase shift direction based on a comparison of correlation values, the phase shift can be corrected even more readily and reliably. Moreover, in the second embodiment, by performing a phase correction within a range having certain limit values, it is possible to prevent an excessive correction of the phase shift so that the phase shift can be corrected correspondingly easily and reliably to improve the bit error rate.

In the case where the phase shift of the received data is corrected on the basis of correlation values which are obtained from one burst, there is a possibility that the direction of the phase shift will be erroneously detected because of the influence of noise, etc.

Accordingly, although a method may be considered of averaging the correlation values among plural bursts to correct the phase shift on the basis of this averaged correlation value, in this case there is a problem that calculations involving floating-point arithmetic, etc., can be intricate.

The following is a description of phase shift correction of a radio receiver in accordance with a third embodiment of the present invention in view of these problems.

In the third embodiment, detection results of the phase shift direction are accumulated to obtain the frequency of the detection, and the phase shift is corrected on the basis thereof.

Figure 15:
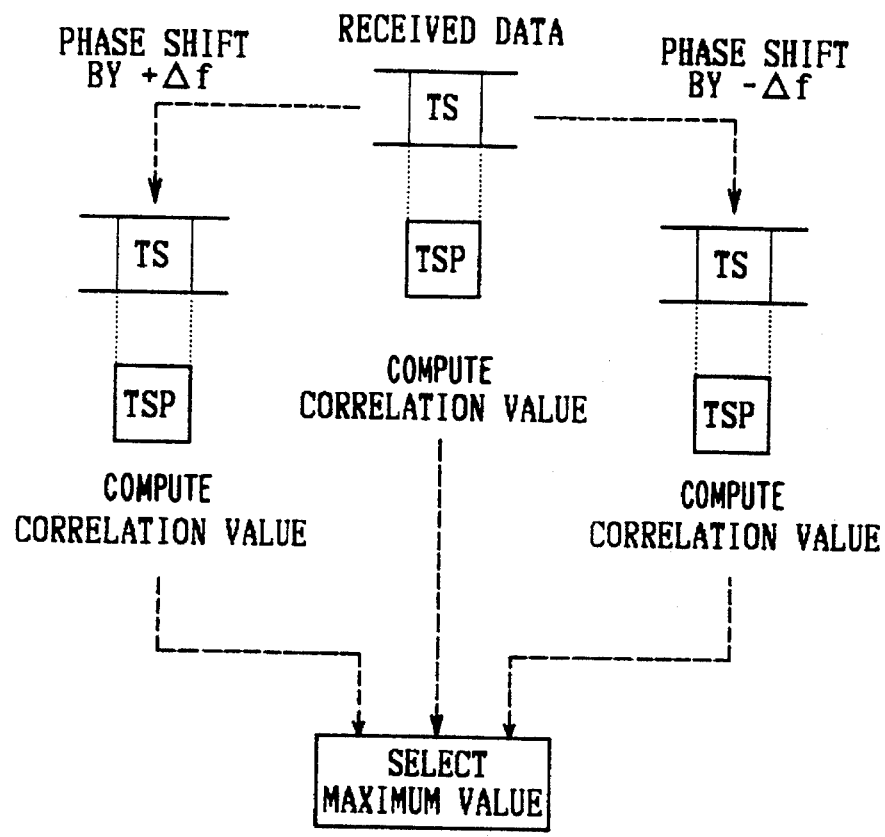
FIG. 15 is a schematic diagram explaining a temporary detection of the phase shift direction.

More specifically, as shown in FIG. 15, the central processing unit 15 in the third embodiment obtains comparison results among the first to third correlation values Cx and Cz to thereby detect a maximum value.

The central processing unit 15 accumulates for a predetermined time period the maximum value of the detection results to thereby detect a correlation value which has the highest rate of frequency of rising to the maximum value.

Figures 16A, 16B:
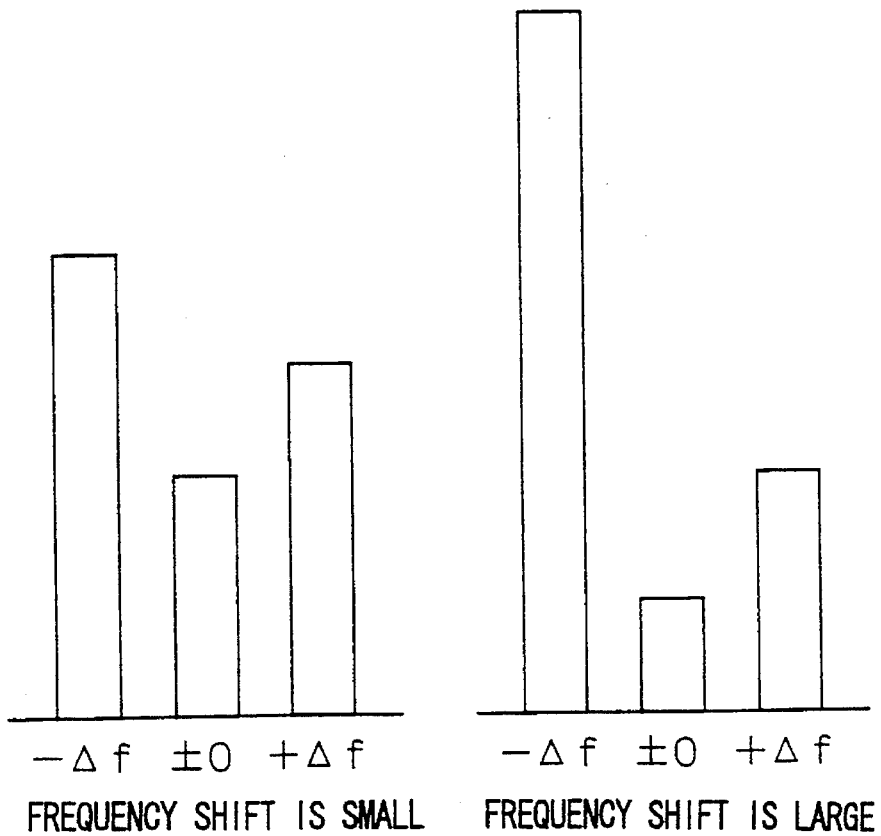
FIGS. 16A and 16B are schematic diagrams explaining a distribution of detection results of the phase shift direction.

More specifically, as FIGS. 16A and 16B show, the case where the first correlation value Cy is the maximum value is indicated by ±0 and the cases where the second and third correlation values Cx and Cz are the maximum value are indicated by $-\Delta f$ and $+\Delta f$, respectively. There is little difference in the rate of recurrence of detection in any of the maximum value detection results $-\Delta f$, $\pm 0$, $+\Delta f$ when the phase shift in the received data is small (FIG. 16A). On the other hand, the rate of recurrence of the maximum value detection indicates a phase shift when such phase shift is large (FIG. 16B)

Thus, the phase shift can be detected on the basis of the frequency of the maximum value detection, and by accumulating detection results, the influence of noise, etc., can be effectively avoided.

Figure 17:
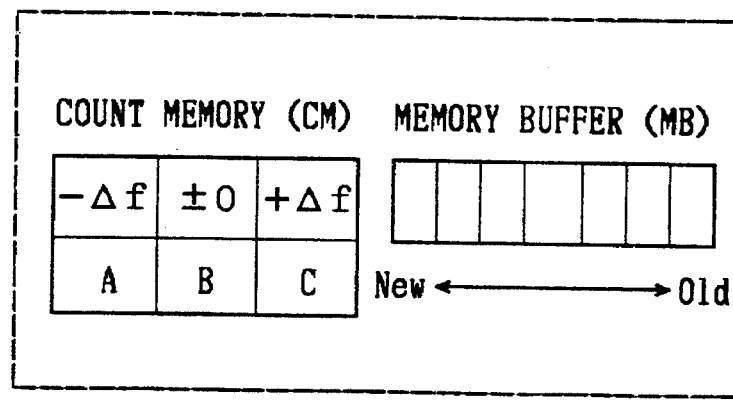
FIG. 17 is a schematic diagram showing the construction of the memory.
Figure 18:
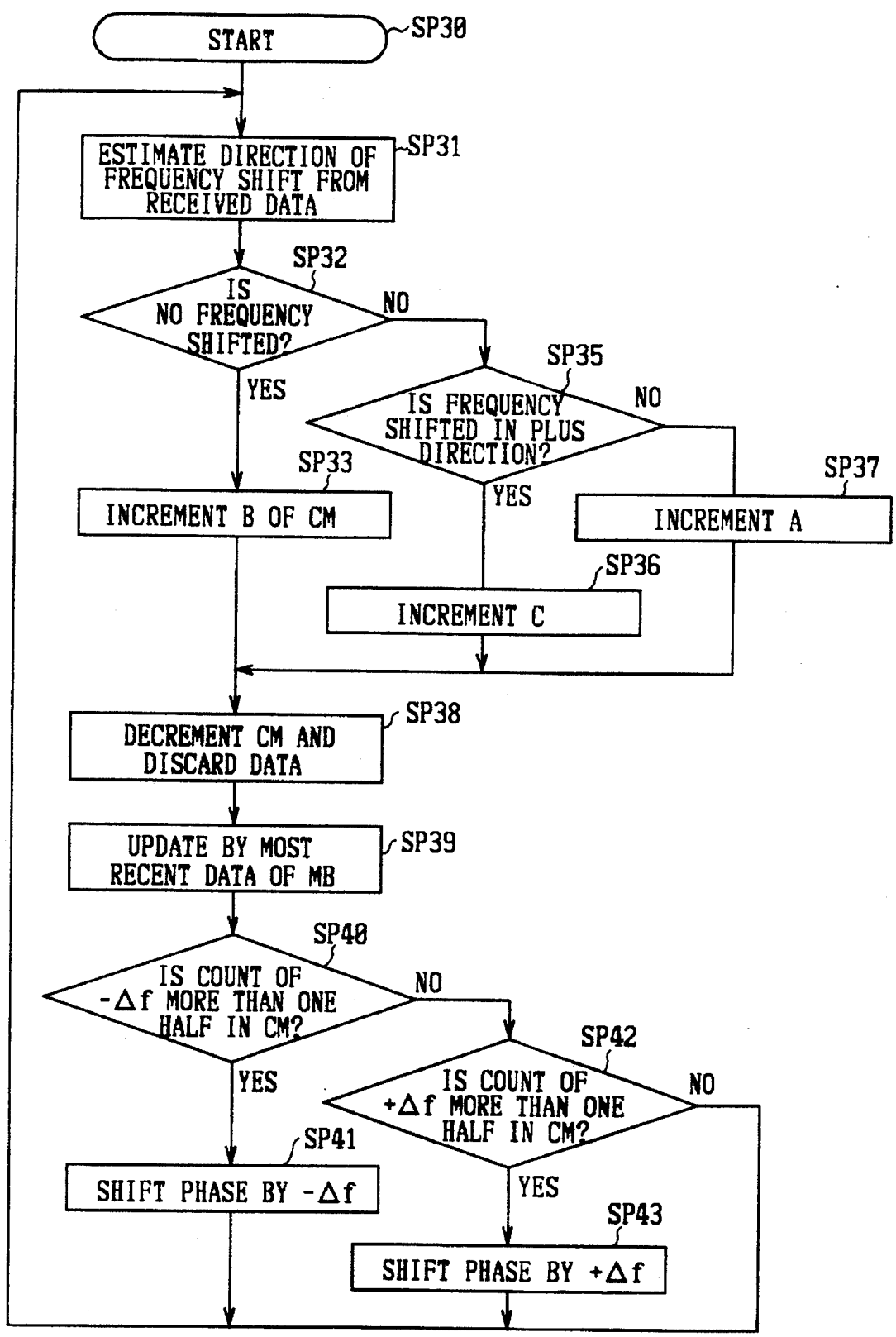
FIG. 18 is a flowchart explaining the operation of a third embodiment of the radio receiver apparatus according to the present invention.

In accordance with this detection principle, the central processing unit 15 in the third embodiment repeats the processing procedure shown in FIG. 18 using a counter memory CM and a memory buffer MB shown in FIG. 17 to detect a phase shift.

More specifically, the central processing unit 15 proceeds from step SP30 to step SP31 and detects the maximum value among the first to third correlation values Cy to Cz to there by determine temporarily a correlation value for which the maximum value is obtained. This also determines the direction of the phase shift of the received data.

Subsequently, the central processing unit 15 proceeds to step SP32 to determine whether or not the received data exhibits a phase shift. When the first correlation value Cy is the maximum value, the program proceeds to step SP33 since an affirmative result is obtained.

The central processing unit 15 increments a first memory area B (FIG. 17) of the counter memory CM by value "1" and then proceeds to step SP38.

On the other hand, if a negative result is obtained at step SP32, the central processing unit 15 proceeds to step SP35 to determine whether the phase shift of the received data is in the direction along which frequency increases.

An affirmative result is obtained at step SP35 when the third correlation value Cz is the maximum value, and in that case the central processing unit 15 proceeds to step SP36. At step SP36, the central processing unit 15 increments a memory area C (FIG. 17) of the counter memory CM by value "1" and then proceeds to step SP38.

On the other hand, if a negative result is obtained at step SP35, this means that third correlation value Cz is the maximum value and the phase shift of the received data is the direction of a frequency decrease. In that case, the central processing unit 15 proceeds to step SP37. The central processing unit 15 increments a memory area A (FIG. 17) of the counter memory CM by value "1" at step SP37 and then proceeds to step SP38.

The terminal device 1 temporarily determines the direction of the phase shift from the first, second and third correlation values Cx, Cy and Cz and stores the result in the counter memory CM. Accordingly, twenty of the latest maximum value detection results are stored in the counter memory CM, each corresponding to one of $-\Delta f$, $\pm 0$, $+\Delta f$.

Subsequently, the central processing unit 15 at step SP38 determines whether or not twenty of the maximum value detection results are already accumulated in the memory buffer MB and, when twenty detection results are already stored at step SP38, reads out the oldest maximum value detection result from the memory buffer MB. Simultaneously, the central processing unit 15 decrements the memory area "1", which corresponds to the maximum value detection result read out. For example, it decrements memory area C by "1" if $+\Delta f$ is read out.

The central processing unit 15 retains the twenty latest maximum value detection results in the memory buffer MB in the order of detection from the older to the newer. Correspondingly, twenty maximum value detection results are accumulated in the counter memory CM on each of the first to the third correlation values, so that twenty maximum value detection results are stored in each memory area.

Further, at this time, by decrementing the counter memory CM from the memory area corresponding to the oldest maximum value detection result read out from the memory buffer MB, the latest maximum value detection result is stored at all times.

The central processing unit 15 thus detects the frequency of detecting the maximum value for each of the first to the third correlation value detection results based on the content of the counter memory CM.

Thus, it is possible to correct the phase shift in accordance with the frequency of occurrence while avoiding the influence of noise.

More specifically, the central processing unit 15, at a subsequent step SP39 (FIG. 18), stores the maximum value detection result detected at step SP31 in the memory buffer MB instead of the oldest maximum value detection result, which is read out; and at a subsequent step SP40 determines whether or not the value in the second memory area "A" corresponding to the second correlation value detection result is "10" or more. If the maximum value detection result newly stored in the memory buffer MB is $-\Delta f$ for instance, memory area "A" of counter memory CM corresponding to the maximum value detection result $-\Delta f$ is incremented by one.

If an affirmative result is obtained at step SP40, the central processing unit 15 determines that the phase shift of the received data is in the direction along which the frequency decreases, and the phase of the received data is corrected in the direction along which the frequency thereof decreases at a subsequent step SP41. The central processing unit 15 then returns to step SP31.

On the other hand, if a negative result is obtained at step SP40, the central processing unit 15 proceeds to step SP42 and determines whether or not the value in the memory area "C" (FIG. 17) corresponding to the third correlation value detection result is ten or more.

If an affirmative result is obtained at step SP42, the central processing unit 15 determines that the phase shift of the received data is in the direction along which the frequency increases, and after correcting the phase of the received data at a subsequent step SP43 in the direction along which frequency thereof increases, returns to step SP31.

If a negative result is obtained at step SP42, this means that a phase shift scarcely occurs. The central processing unit 15 then directly returns to step SP31.

In accordance with the operation shown in FIG. 18, the phase shift direction is temporarily determined from a correlation detection result, and the phase shift is corrected by detecting the frequency of occurrence of the phase shift direction. This confers all the advantages of the first embodiment. In addition, a phase shift can be corrected reliably while avoiding the influence of noise, etc.

The preceding embodiments are described with respect to the case where the phase shifts of the received data are determined by executing operational processing of equations (2) and (3). That is, there is multiplication processing with a bit pattern for training sequence detection whereby correlation values are detected to determine phase shift information. However, the invention is not limited to this. When a Viterbi decoding circuit is used to decode the received data, the state metric detected at the Viterbi decoding circuit may be used instead of the correlation values as a reference to correct a phase shift.

More specifically, the technique of Viterbi decoding is applied in a state synchronized with a burst to decode the received data, and then the state metric by which the best path is obtained when the phase of the received data is shifted is detected. Advantages similar to those afforded by the first to third embodiments may be obtained by comparing a state metric value at the beginning with a state metric value obtained with the phase being shifted, instead of using the first to third correlation values.

Further, the third embodiment is described above with respect to the case where the maximum value detection result is stored in a memory buffer. However, the invention is not limited to this; a ring buffer formed so that a pointer is shifted may be used instead of the memory buffer.

Also, the third embodiment is described above with respect to the case where merely the direction of the phase shift is detected on the basis of the frequency of the maximum value detection results. However, the invention is not limited to this; the amount of the phase shift may also be detected.

More specifically, since the extent of the phase shift can be determined in accordance with the distribution of the detection result as described above with the respect of FIGS. 16A and 16B, operational processing of the equation $$\Delta f correct = \Delta f max \times \{1-(Xmax-X(\Delta f))/Xrange\} \quad (14)$$

may be executed to detect a frequency correcting amount $\Delta f correct$.

In the equation, $\Delta f max$ indicates the maximum value of the correcting frequency; $Xmax$ indicates the maximum value of the frequency of occurrence, $X(\Delta f)$ indicates the frequency of occurrence at the time of a frequency $\Delta f$, and $Xrange$ indicates the range of variation at the time of $X(\Delta f)$.

Furthermore, the embodiments are described above with respect to the case where the invention is applied to a digital cellular system to correct a phase shift by using a training sequence. However, the invention is not limited to this, but may be widely applied to other cases where various data are received by various types of radio receiver apparatus.

While the preferred embodiments of the invention have been described, it will be clear to those skilled in the art that various changes and modifications may be made. The appended claims therefore cover all such changes and modifications as fall within the true spirit and scope of the invention.

What is claimed is:

1. A radio receiver apparatus for receiving a transmission signal, on the basis of a reference pattern inserted in the transmission signal by a transmitter at a predetermined timing, comprising:

receiving means for demodulating said transmission signal to output received data;

received data processing means for data processing said received data in synchronization on the basis of the reference pattern formed by a predetermined bit pattern and producing processed received data;

first phase shift information detection means for detecting a first phase shift information of said received data with respect to said processed received data;

second phase shift information detection means for shifting the phase of said received data and producing phase-shifted received data, and for detecting a second phase shift information of said phase-shifted received data with respect to said processed received data; and means for effecting a correction ppm of the phase shift of said received data based on a comparison between outputs from said first phase shift detection means and said second phase shift detection means, where ppm has a magnitude such that $0 \leq ppm \leq hppm/2$, hppm being the maximum value of said second phase shift information.

2. The radio receiver apparatus according to claim 1, wherein:

said second phase shift information detection means shifts the phase into a lagging phase and a leading phase of said received data, and detects said second phase shift information on the basis of said reference pattern, thereby detecting two types of said second phase shift information corresponding to said lagging phase and said leading phase, respectively;

said second phase shift information detection means detects the phase shift direction and amount of said received data, based on said first phase shift and said two types of second phase shifts; and the phase shift of said received data is corrected by said means for effecting a correction based on said phase shift direction and amount.

3. The radio receiver apparatus according to claim 1, wherein:

said second phase shift information detection means shifts the phase into a lagging phase and a leading phase of said received data and detects said second phase shift information on the basis of said reference pattern, thereby detecting two types of said second phase shift information corresponding to said lagging phase and said leading phase, respectively;

said second phase shift information detection means detects the phase shift direction of said received data, based on said first phase shift information and said two types of second phase shift information; and the phase shift of said received data is corrected by said means for effecting a correction based on accumulated result of the detected results in said phase shift direction.

4. A method for phase correction of a radio receiver apparatus in which a transmission signal is received on the basis of a reference pattern inserted in the transmission signal by a transmitter at a predetermined timing, comprising the steps of:

calculating a first correlation value between said reference pattern and received data, and simultaneously calculating a second correlation value and a third correlation value in the case of a lagging phase and a leading phase by changing the frequency of said received data;

judging whether said first correlation value obtained by said calculating is the largest value among the first, second, and third correlation values obtained by said calculating; and effecting a correction ppm of the phase of the received data on the basis of a result of said judging, where ppm has a magnitude such that $0 \leq ppm \leq hppm/2$, hppm being the maximum value of said lagging or leading phase.

5. The method for phase correction of the radio receiver apparatus according to claim 4, wherein in the case where said first correlation value obtained by calculating is the largest value among said first, second, and third correlation values obtained by calculating, the phase correction for correcting the phase shift of the frequency of said received data is not performed.

6. The method for phase correction of the radio receiver apparatus according to claim 4, wherein in the case where said third correlation value obtained by said calculating is the largest value among said first, second, and third correlation values obtained by said calculating, the frequency of said received data is corrected in the direction that the phase leads.

7. The method for phase correction of the radio receiver apparatus according to claim 4, wherein in the case where said second correlation value obtained by said calculating is the largest value among said first, second, and third correlation values obtained by said calculating, the frequency of said received data is corrected in the direction that the phase lags.

8. A method for phase correction for use in a radio receiver apparatus in which a transmission signal is received based on a reference pattern inserted in said transmission signal by a transmitter at a predetermined timing, comprising the steps of:

calculating a first correlation value between said reference pattern and received data, and simultaneously calculating a second correlation value and a third correlation value in the case of a lagging phase and a leading phase by changing the frequency of said received data;

calculating a phase shift direction and a phase shift amount based on the first, second, and third correlation values obtained by said calculating; and effecting a correction ppm of the phase of said received data on the basis of the phase shift direction and phase shift amount obtained by said calculating, where ppm has a magnitude such that $\leq ppm \leq hppm/2$, hppm being the maximum value of said phase shift amount.

9. The method for phase correction of the radio receiver apparatus according to claim 8, wherein in the case where said first correlation value obtained by calculating is the largest value among said first, second, and third correlation values obtained by calculating, the phase correction for correcting the phase shift of frequency of said received data is not performed.

10. A method for phase correction for use in a radio receiver apparatus in which a transmission signal is received based on a reference pattern inserted in said transmission signal by a transmitter at a predetermined timing, comprising the steps of:

calculating a first correlation value between said reference pattern and received data, and simultaneously calculating a second correlation value and a third correlation value in the case of a lagging phase and a leading phase by changing the frequency of said received data;

detecting a maximum correlation value by comparing said first, second, and third correlation values obtained by said calculating;

accumulating successive ones of said maximum correlation values for a predetermined period;

detecting a correlation value which rises to a maximum value on the basis of a result of said accumulating;

detecting phase shift information on the basis of the maximum correlation value obtained by said detecting; and effecting a correction ppm of the phase shift of frequency of said received data based on the detected phase shift information, where ppm has a magnitude such that $\leq$ppm$\leq$hppm/2, hppm being the maximum value of said phase shift information.

11. The method for phase correction of the radio receiver apparatus according to claim 10, in which the obtained maximum correlation value is determined as the temporary phase shift direction of the received data among said first, second, and third correlation value obtained by calculating.

12. The method for phase correction of the radio receiver apparatus according to claim 10, wherein when said maximum correlation value obtained by detection is said second or said third correlation value, the phase of frequency of said received data is lagged if said second correlation value is largest, and the phase is led if said third correlation value is largest.

13. A radio receiver apparatus for receiving a transmission signal on the basis of a reference pattern inserted in said transmission signal by a transmitter at a predetermined timing, comprising:

receiving means for demodulating said transmission signal and outputting received data;

phase correction means for calculating a correlation value of the received data based upon said reference pattern supplied from said transmitter and the received data sequentially input to said phase correcting means and correcting the phase of said received data;

control means for detecting phase shift information based on the correlation value supplied from said phase correction means and controlling said phase correction means to effect a corection ppm of said phase shift information on the basis of the detected phase shift information, where ppm has a magnitude such that $\leq$ppm$\leq$hppm/2, hppm being the maximum value of said second phase shift information.

14. The radio receiver apparatus according to claim 13, wherein:

said phase correction means forms a state where the phase of said received data is shifted based on the control signal from said control means and calculates further a plurality of correlation values on the basis of said received data in a state of phase shifting and said reference pattern, and said control means detects the phase shift information based on the compared result of a plurality of these correlation values.

15. The radio receiver apparatus according to claim 14, wherein:

if it is determined that said correlation value corresponding to the received data is the largest value among a plurality of correlation values outputted from said phase correction means, the phase correction in said phase correction means is not performed.

16. The radio receiver apparatus according to claim 13, wherein:

said receiving means comprises a demodulating section for demodulating I-data and Q-data by the received signal and a synchronization signal detecting section for detecting the synchronization signal, and said control means synchronizes and controls the whole apparatus based on the synchronization signal outputted from said synchronization signal detecting part.

* * * * *